(12) United States Patent
Horn et al.

(10) Patent No.: US 10,848,411 B2
(45) Date of Patent: Nov. 24, 2020

(54) TEST SYSTEM AND METHOD FOR TRIGGERING OR SEARCHING IN INPUT DATA DECODED WITH A USER DEFINED PROTOCOL

(71) Applicant: Rohde & Schwarz GmbH & Co. KG, Munich (DE)

(72) Inventors: Armin Hans Horn, Newberg, OR (US); Joe Zhang, Lake Oswego, OR (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 107 days.

(21) Appl. No.: 15/912,357

(22) Filed: Mar. 5, 2018

(65) Prior Publication Data

US 2019/0273674 A1 Sep. 5, 2019

(51) Int. Cl.
*H04L 29/06* (2006.01)
*H04L 12/26* (2006.01)
*G06F 3/0482* (2013.01)
*H04L 12/24* (2006.01)

(52) U.S. Cl.
CPC ............ *H04L 43/18* (2013.01); *G06F 3/0482* (2013.01); *H04L 41/22* (2013.01); *H04L 43/045* (2013.01); *H04L 69/03* (2013.01); *H04L 69/18* (2013.01)

(58) Field of Classification Search
CPC ..... H04L 67/18; H04L 41/00; H04L 41/0803; G06F 15/16; G06F 16/9535; G06F 16/972
USPC ........................................................ 709/224
See application file for complete search history.

(56) References Cited

U.S. PATENT DOCUMENTS

| 7,401,326 | B1 | 7/2008 | Durham et al. | |
|---|---|---|---|---|
| 8,027,096 | B2 * | 9/2011 | Feng | G02B 3/14 235/454 |
| 8,489,112 | B2 * | 7/2013 | Roeding | G01S 5/18 455/456.1 |
| 8,532,067 | B2 * | 9/2013 | Gerakoulis | H04L 1/1803 370/335 |
| 8,542,249 | B2 * | 9/2013 | Ishida | G16H 30/40 345/629 |
| 9,264,151 | B1 * | 2/2016 | Emigh | G06Q 30/0211 |
| 9,754,385 | B2 * | 9/2017 | Dawood | G06T 9/00 |
| 9,916,538 | B2 * | 3/2018 | Zadeh | G06K 9/627 |
| 9,977,805 | B1 * | 5/2018 | Bowman | G06F 16/27 |
| 10,201,929 | B2 * | 2/2019 | Sadusk | B33Y 50/02 |
| 10,254,577 | B2 * | 4/2019 | Lim | G02F 1/133509 |
| 10,282,461 | B2 * | 5/2019 | Snell | G06F 16/285 |

(Continued)

OTHER PUBLICATIONS

Rohde & Schwarz, "R&S RTO Protocol Analysis", User Manual 1332.9725.02-10, 772-837.

*Primary Examiner* — Tesfay Yohannes
(74) *Attorney, Agent, or Firm* — Potomac Technology Law, LLC

(57) ABSTRACT

A test system for triggering or searching in input data decoded with a user defined protocol is provided. The test system comprises a processor and a display. The processor is configured to control the display to display a graphical user interface (GUI), and to receive input data. The GUI is configured to provide an input structure for a user to define protocol layer frames for decoding the input data. Based on the defined protocol layer frames, the processor is configured to generate a set of trigger or search options, and to control the display to display the set of trigger or search options.

18 Claims, 4 Drawing Sheets

(56) References Cited

U.S. PATENT DOCUMENTS 10,353,951 B1 * 7/2019 Li ..................... G06F 16/5866
10,380,650 B2 * 8/2019 Hamedi ............. G06Q 30/0271

* cited by examiner

Management Frame Fields

| Frame | PRE | ST | OP | PHYAD | REGAD | TA | DATA | IDLE |
|---|---|---|---|---|---|---|---|---|
| WRITE | 1...1 | 01 | 01 | AAAAA | RRRRR | 10 | DDDDDDDDDDDDDDDD | Z |
| READ | 1...1 | 01 | 10 | AAAAA | RRRRR | Z0 | DDDDDDDDDDDDDDDD | Z |

TEST SYSTEM AND METHOD FOR TRIGGERING OR SEARCHING IN INPUT DATA DECODED WITH A USER DEFINED PROTOCOL

TECHNICAL FIELD

The invention relates to a test system and a method for triggering or searching in input data decoded with a user defined protocol, wherein the protocol is defined using a graphical user interface providing an input structure for a user to define protocol layer frames for decoding the input data.

BACKGROUND

The amount of digital data generated all over the world is growing steadily. Streaming services that provide movies, tv-programs, radio-programs and many other services to users via the internet are one of the drivers for increasing data growth. Furthermore, the business sector requires a huge amount of data to transmit documents, videos and electronic mails (emails). Moreover, more and more machine data within the Internet of Things (IoT) and Industry 4.0 is generated. The process of transporting all the generated data from one location to another is called data communication, the generated data is transported via data transmission networks. Frequently, used data transmission networks are Local Area Networks (LAN), a Metropolitan Area Networks (MAN) or a Wide Area Networks (WAN). To be able to exchange data between different computers or processes network-protocols are required. A variety of standardized network protocols are available and additionally customized network protocols configured for specific applications are available. Furthermore, new network protocols are developed or existing ones are modified to improve data transmission.

The U.S. Pat. No. 7,401,326B1 relates to a method for generating a program code to be used by a protocol analyzer for interpreting and analyzing a protocol type based on a protocol database that includes definition or information describing the relevant characteristics of a particular protocol. The program code required for decoding a particular protocol can be compiled automatically using the protocol database. The U.S. Pat. No. 7,401,326B1, however, does not provide a convenient graphical user interface to define the protocol layer frames to be able to decode input data and the document is silent regarding the generation of trigger or search options.

Accordingly, there is a need for a test system and method for triggering or searching in input data encoded according to a protocol not implemented in the test system.

SOME EXAMPLE EMBODIMENTS

Embodiments of the present invention advantageously address the foregoing requirements and needs, as well as others, by providing a test system and method for triggering or searching in input data encoded according to a protocol not implemented in the test system. By way of example, the provided test system and method may be user configurable by defining protocol layer frames, and may be capable of decoding a variety of protocols based on the user configuration. By way of further example, the provided test system and method may provide for the performing of trigger and search functions within one or more of the decoded data frames and/or within cells within the data frames. By way of further example, a graphical user interface (GUI) may be included, providing an input structure for a user to define protocol layer frames for decoding the input data to be displayed and a set of trigger or search options may be presented to the user based on the defined protocol layer frames.

According to a first aspect of the invention, a test system for triggering or searching in input data decoded with a user defined protocol is provided. The system comprises a processing unit and a display unit. The processing unit is configured to present a graphical user interface (GUI) on the display unit and to receive input data. Further, the GUI provides an input structure for a user to define protocol layer frames for decoding the input data. Based on the defined protocol layer frames, the processing unit is configured to generate a set of trigger or search options and to display the options on the display unit. The input data may be data from a serial bus that is custom to the user. The GUI allows the user to define protocol layer frames for the serial data and being able to decode the serial data. However, the input data may provide any protocol structure and can be decoded by defining the protocol structure via the GUI. Further, trigger and search options suitable for the encoded input data are generated and displayed automatically by the processing unit.

Advantageously, the user input structure provided by the GUI allows the user to define the protocol for the input data. Since there is a variety of different network types and each of the different network types may have different sets of standards (e.g., protocols) it is impossible to provide a test system knowing all possible protocols to be able to decode the incoming data (the input data). Based on the user defined format description via the GUI an interactive menu is created that provides to the user a set of trigger or search options.

By way of example, the protocol decoding functionality of an oscilloscope may be enhanced by adding a processing unit to the protocol decoder of the oscilloscope for decoding, triggering and searching, wherein the GUI provided by the processing unit is displayed on the display unit of the oscilloscope. The processing unit is further configured to receive input data from the oscilloscope. The GUI provides an input structure for a user to define protocol layer frames for decoding the input data. Based on the defined protocol layer frames, the processing unit is configured to generate a set of trigger or search options and to display the options on the display unit of the oscilloscope.

According to a first implementation form of the provided test system, the processing unit is configured to decode the input data in frames arranged in cells based on the defined protocol layer frames. Advantageously, any input data, which may be a data stream or consists of data packets or data frames encoded according to any protocol (e.g., a data protocol, a network protocol or a communication protocol, hereinafter referred to as a protocol), can be decoded based on the defined protocol layer frames. A data packet (e.g., an internet protocol (IP) packet) is also called a frame consisting of control information and user data, which is also known as payload. The structure of an IP packet and the structure of almost any data frame can be described as a frame arranged in cells. An example configuration, therefore, comprises a configuration of the processing unit to decode the input data in frames arranged in cells.

According to a further implementation form of the provided test system, the input structure for the definition of protocol layer frames is a table. Advantageously, the representation of the input structure as a table structure is similar to table structures known from other software tools such as Excel or other table-like structured programs. Thus, a huge number of users is able to work with such a user interface almost intuitively. Further, the table structure can easily be modified by inserting, removing or appending cells. Cells can provide pre-defined selections that can easily be chosen by the user.

According to a further implementation form of the provided test system, the GUI allows the user to select one or more of the displayed trigger or search options and to enter trigger or search conditions for the selected trigger or search options. Advantageously, only a selection of trigger or search options that are suitable for the decoded frames are presented to the user via the GUI and the user can easily select one or more desired trigger or search options. Further, the user can enter trigger or search condition for selected trigger or search options. The user may receive a table of the cells within a frame as trigger or search option. The user can select one or more of the cells and define trigger or search conditions for the selected cells.

By way of example, the user defined trigger or search conditions may be converted by the processing unit based on the protocol into basic oscilloscope trigger or search capabilities, or into other suitable parameters for performing the trigger or search function. Such basic oscilloscope trigger or search capabilities may, for example, comprise threshold, rising edge, falling edge or similar.

By way of further example, trigger or search conditions may include a predetermined value or a predetermined range. In other words triggering or searching is performed based upon a predetermined value or a predetermined range. The information that is included in the input data may transported by a protocol message and contains values. These values may extend over a wider range. Therefore, it is desirable to trigger or search not only on or for a specific protocol message but also upon the content respectively information transported by the protocol message.

By way of further example, the GUI may allow the user to search for additional trigger or search options in a pre-defined selection list, for example, in case the generated set of trigger or search options is not useful for the user. By way of further example, the GUI may allow the user to manually generate a set of trigger or search options.

According to a further implementation form of the provided test system, the GUI allows the user to select one or more frames and/or cells for one or more trigger or search options. Advantageously, the user can define for which frames and/or cells the trigger and search function shall be performed. The user can decide if the trigger or search function is performed in one or more frames, and the user can additionally define one or more cells within the selected frames in which a trigger or search function is performed. Thus, the user can define very specifically the frames and cells intended to be triggered on or searched.

According to a further implementation form of the provided test system, the processing unit is configured to perform a trigger or search function within one or more selected frames and/or cells and to display the trigger or search results on the display unit via the GUI. Advantageously, the trigger or search function is performed only within the selected frames and cells and the results of the performed trigger or search function are displayed. Thus, the user is able to perform a very specific trigger and search function and display the results of the performed trigger or search function. This supports the user to detect errors within a network, since the trigger and search function can be performed very detailed and the user can focus on the frames and cells of interest.

According to a further implementation form of the provided test system, the GUI allows the user to define display options for displaying the trigger or search results. Advantageously, the user can further adapt the presentation of the results of a performed trigger or search function to be able to display the required information. This feature further supports the user to analyze complex networks and to gain the information to resolve network problems.

According to a further implementation form of the provided test system, the trigger or search conditions for the selected trigger or search option can define one or more frame or frame types. Advantageously, the user can define the frame or frame type relevant for a trigger or search function just by defining the trigger or search condition. The user can trigger on or search within several frames but the user can further only trigger on or search within different frame types. Triggering on a frame or frame type or searching within a frame or frame type allows a higher abstraction level instead of just defining bit-wise trigger or search conditions. The user can trigger on or search for, exemplarily an acknowledgement frame or an address frame.

According to a further implementation form of the provided test system, the trigger or search conditions for the selected trigger or search option can define one or more cells of interest within the one or more frame or frame types. Advantageously, just by defining trigger or search conditions for a selected trigger or search option the user can determine cells of interest within one or more already selected frames or frame types for which the trigger or search function has to be performed. Thus, the user can easily define cells within one or more frames or frame types.

According to a further implementation form of the provided test system, the trigger or search conditions for the selected trigger or search option define particular values to be triggered on or searched for within one or more cells. Advantageously, the user can easily define particular values within one or more cells that have to be searched or that initiate a trigger function.

According to a second aspect of the invention, a method for triggering or searching in input data decoded with a user defined protocol is provided. The method comprises the steps of displaying a graphical user interface (GUI) on a display unit and receiving input data with the aid of a processing unit. The method further comprises the steps of providing the GUI presented on the display unit with an input structure for the user to define protocol layer frames for decoding the input data, and generating a set of trigger or search options based on the defined protocol layer frames and displaying the options on the display unit with the aid of the processing unit.

According to a first implementation form of the provided method, the method further comprises the step of decoding the input data based on the defined protocol layer frames in frames arranged in cells with the aid of the processing unit.

According to a further implementation form of the provided method, the method further comprises the step of generating an input structure for the definition of protocol layer frames in table form.

According to a further implementation form of the provided method, the method further comprises the step of accepting user selection of one or more of the displayed trigger or search options and accepting user input of trigger or search conditions for the selected trigger or search options with the aid of the GUI configured by the processing unit.

According to a further implementation form of the provided method, the method further comprises the step of providing a GUI allowing the selection of one or more frames and/or cells for which the trigger or search options is desired with the aid of the processing unit.

According to a further implementation form of the provided method, the method further comprises the step of performing a trigger or search function within the one or more selected frames and/or cells and displaying the trigger or search results obtained by the trigger or search function on the display unit via the GUI with the aid of the processing unit.

According to a further implementation form of the provided method, the method further comprises the step of providing the GUI for defining display options for displaying the trigger or search results.

According to a further implementation form of the provided method, the method further comprises the step of defining one or more frames or frame types as trigger or search condition for the selected trigger or search option.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which:

FIG. 2 shows a block diagram of an example frame structure of the Management Data Input/Output (MDIO) protocol according to example embodiments of the present invention;

DETAILED DESCRIPTION

A test system and method for triggering or searching in input data encoded according to a protocol not implemented in the test system are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 1:
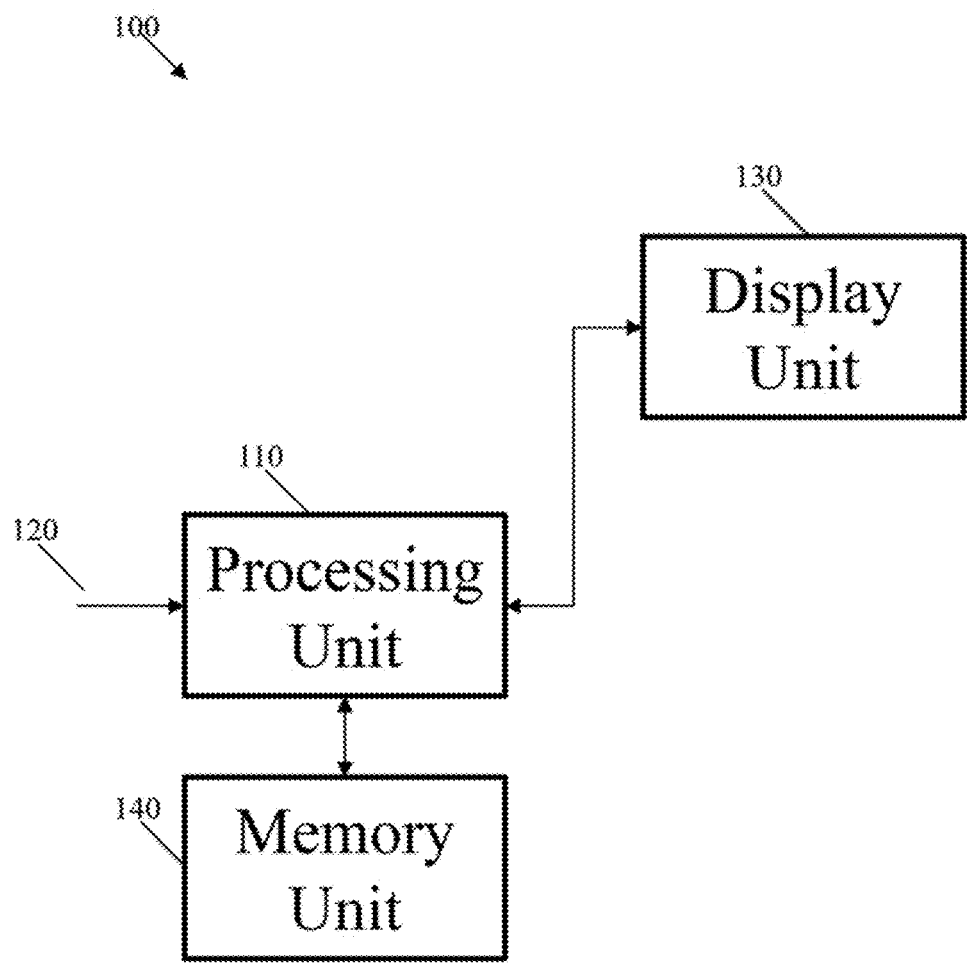
FIG. 1 shows a block diagram of an example test system according to example embodiments of the present invention.

FIG. 1 shows a block diagram of an example test system 100 according to example embodiments of the present invention. FIG. 1 depicts a processing unit 110 that is configured to receive input data 120 from a network. The input data may be a data stream or data packet formatted based on a specific protocol. Within this application, the expression protocol includes communication protocols used in telecommunications as well as network protocols used to exchange data between computers and processes but is not limited thereto. The test system further comprises a display unit 130 that is connected to the processing unit 110. The processing unit 110 is further configured to present a graphical user interface (GUI) on the display unit 130.

By way of example, the display unit 130 is a touch screen and the user can interact with the GUI by touching the touch screen. It is also conceivable, that a keyboard, mouse or any other indicating device may be used, so that the user can interact with the GUI. The processing unit is further configured to receive and process data, based on the user inputs made via the input structure provided by the GUI. The test system can optionally include a memory unit 140 that is capable of storing data received from the processing unit 110, or to send stored data to the processing unit 110. It is also conceivable, however, that the processing unit may provide a memory functionality or internal memory.

FIG. 2 shows a block diagram of an example frame structure 200 of the Management Data Input/Output (MDIO) protocol according to example embodiments of the present invention. The MDIO protocol is used for bidirectional transfer of control and status information between a physical layer entity (PHY) and a station management entity (STA). A major application of MDIO is fault detection by interrogating registers of physical devices. Hence, MDIO serial bus visualization helps debugging new products by giving developers a quick insight into the native data on the bus without using a special decoder. The MDIO protocol represents just one example of a possible frame structure applicable in example embodiments of the present invention.

Figure 3:
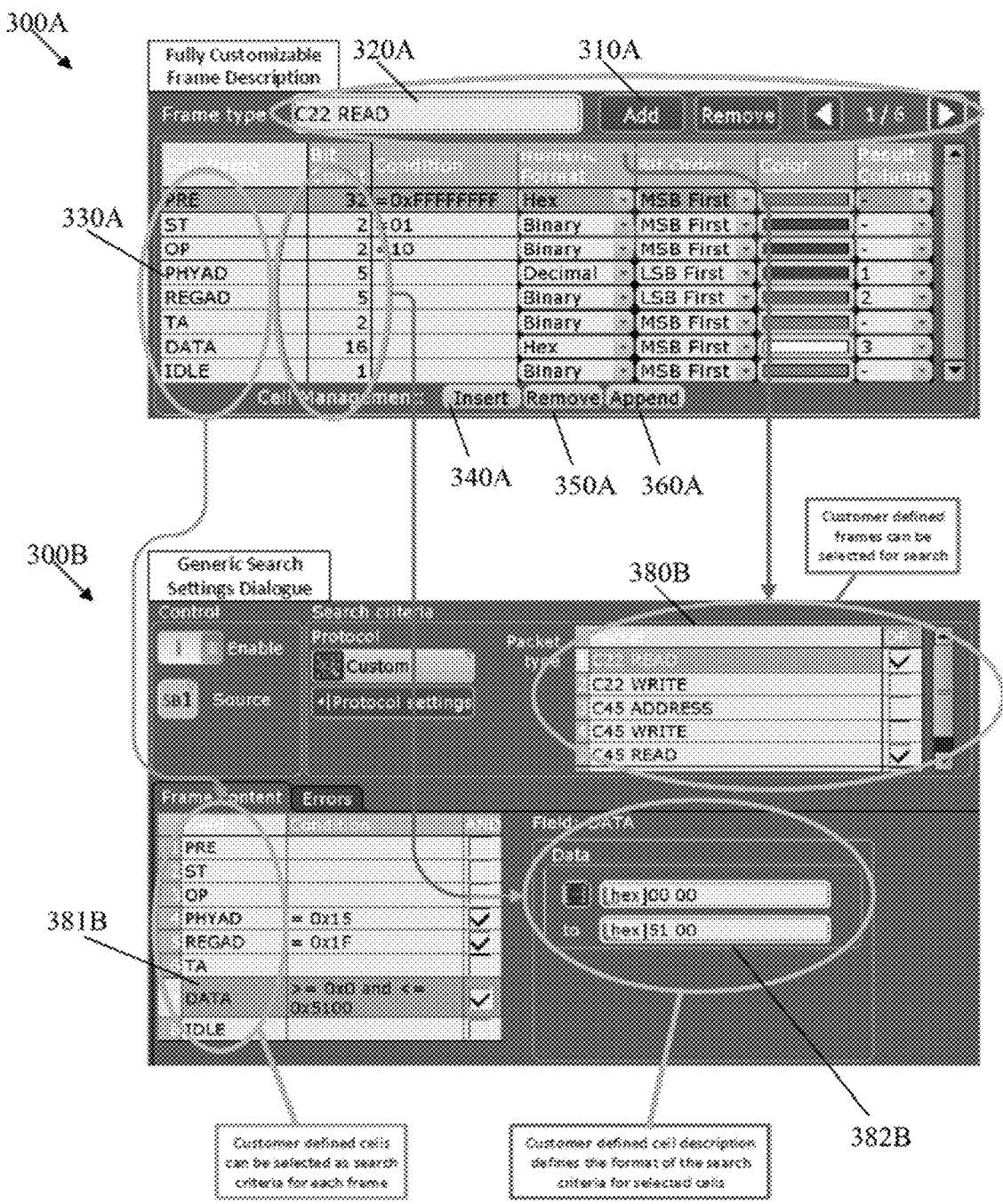
FIG. 3, 300A shows the graphical user interface for the definition of protocol layer frames, and 300B shows the graphical user interface for defining search conditions, according to example embodiments of the present invention.

The frame structure of the MDIO protocol is further used in FIG. 3 to describe how a protocol layer structure is defined via the input structure provided by the GUI.

The structure of MDIO frames depicted in FIG. 2, shows two frame types, a Read type and a Write type, which include a preamble (PRE), consisting of 32 logic "one" bits ("1 . . . 1"). The structure further includes a start of frame (ST) code consisting of two bits and an operation code (OP) specifying a type of transaction. A transaction could be to perform a read or a write function. The frame structure further includes the address of the physical layer entity (PHYAD) and a register address (REGAD) within the physical layer entity (PHY). The MDIO frame structure additionally provides a turnaround time (TA) field to determine a two bit time spacing between the register address (REGAD) and DATA. The MDIO structure also includes a data field containing 16 bits of payload data and an idle field including a single value indicating to the physical medium attachment that there is no data to convey. By way of example, FIG. 3 depicts how a protocol frame structure (in this example the frame structure of the MDIO protocol) is defined with the aid of a GUI providing an input structure for a user to define appropriate protocol layer frames, in other words to define the frame format description.

FIG. 3 shows the graphical user interface for the definition of protocol layer frames, and the graphical user interface for defining search conditions, according to example embodiments of the present invention. FIG. 3 shows two different dialog windows 300A, 300B of the graphical user interface (GUI).

The upper portion of FIG. 3 depicts a GUI 300A providing an input structure for a user to define protocol layer frames. The GUI (or user interface) allows a fully customizable frame description. The term "protocol layer frames" has the identical meaning as "frame format description." Both expressions may therefore equally be used within this document.

The user is able to describe the generic format and logical structure of the protocol that is used for the input data by creating customized frame format descriptions of various structures and lengths. By clicking the "Add" button 310A within the user interface 300A a frame format description (or frame description, for short) can be created. Describing a frame format requires assigning it a "Name" 320A as well as creating "Cells" 330A and specifying cell descriptions.

The "Frame type" string is intended for the user to label the frame description, in other words to define the name of the frame. Typically, a "Frame type" string is labeled according to the specifications of the applicable protocol standard. The user interface allows the user to open already stored sets of frame descriptions or save a created set of frame descriptions (not shown). An example format to store the frame descriptions is the "xml" format. The "xml" format is a markup language defining a set of rules for encoding documents in a format that is human-readable and machine-readable. Although the design of "xml" focuses on documents, the language is widely used for the representation of arbitrary data structures.

A cell description, which is represented by one row in one frame description can be created by the user in any position of a frame description by clicking the "Insert" 340A button within the user interface 300A. The "Append" 360A button adds a cell description at the end of a frame description, below the lowest existing cell description. The "Remove" 350A button allows the user to delete a selected cell description from the active frame description.

The cells in a frame are described by "Cell Name, Bit Count, Conditions, Numeric Format, Bit Order, Color and Result Column." The user can define cell names, which improves readability of the structure by selecting names according to the cell definition in the appropriate protocol. According to FIG. 3, the cells are named PRE, ST, OP, PHYAD, REGAD, TA, DATA and IDLE.

The bit count information defines the length of the cell and—based upon the previous cells—also the cell position and the next cell start position within a frame.

The condition field is used to apply various conditions and functionalities for a cell. Among others, it can be used to identify mandatory values such as a checksum value or an identification value.

The numeric format field allows the user to specify a numeric data format for the condition value. Numeric data formats may be decimal, hexadecimal, octal or binary. The bit order field allows the user to define in which order the bits of a cell's condition value are evaluated, either the most significant bit (MSB) or the least significant bit (LSB) first.

Choosing the color field opens a dialog that allows the user to select the color representation of different cells.

The lower portion of FIG. 3 shows a GUI 300B, in this example named "Generic Search Settings Dialog" (or search dialog) that is generated based on the defined protocol layer frames, as depicted in the GUI 300A of FIG. 3.

The search dialog structure easily allows the user to select one of the defined protocol layer frames by providing a list 380B with the available frames. A selection of a frame displays the cells related to the selected frame. One or more of the cells can be selected. For the active selected field (e.g., the data cell 381B in the lower portion of FIG. 3), a field is provided on the user interface that allows the user to define search conditions 382B for the selected active cell 381B.

FIG. 3 shows that the cells that have been defined for a frame based on a user defined protocol format are made available to the user in a search dialog within the GUI to perform a search function. The user can easily select one or more frames and define one or more cells within the selected frames where a search shall be performed. For each cell the user can easily specify the desired search criteria also called search conditions.

Analogous, the user dialog to define trigger settings, the trigger dialog is generated based on the defined protocol layer frames. One or more frames can be selected and one or more cells within the selected frames can be selected. For each cell the trigger criteria also called trigger conditions can be defined.

Thus, the GUI allows the user to define frame descriptions to be able to decode input data encoded according to a protocol not known to the test system. Further, a search or trigger dialog within the GUI is generated based on the defined frame descriptions and the trigger or search dialog allows the user to select one or more specific frames and further to select one or more cells within the frames and define trigger or search conditions for a set of trigger or search options provided by the user interface in the trigger or search dialog.

An example is given, where the trigger condition is a predetermined value. There is an input data containing the following bit sequence: 0 0 0 1 0 1 0 1. The user determines a protocol, in other words, the user defines a custom protocol, in which the frame consists of 4 bits, and in which the frames have a simple binary coding scheme. The user defines a value trigger, which should trigger if the value in a frame is equal or above 5 (decimal). The input data is first decoded according to the custom protocol, in other words based on the user defined protocol layer frames. After receiving the first frame, no trigger function is performed, since the value of the first frame 0 0 0 1 is 1 (decimal). During or after receiving the second frame 0 1 0 1 a trigger function is performed (e.g., the acquisition of input data is started), since the second frame has the value 5 (decimal), which complies with the defined trigger condition.

The use of scripts in "xml" format allows the user to easily adapt the test system for various protocols. A "xml" script is provided to generate the GUI that is presented to the user for defining the protocol layer frames. Based on the definitions made by the user via the user interface, the "xml" file is automatically updated to incorporate the user definitions in the file. No compiling of the "xml" script is required. Based on the script content the processing unit is configured to decode the input data.

Figure 4:
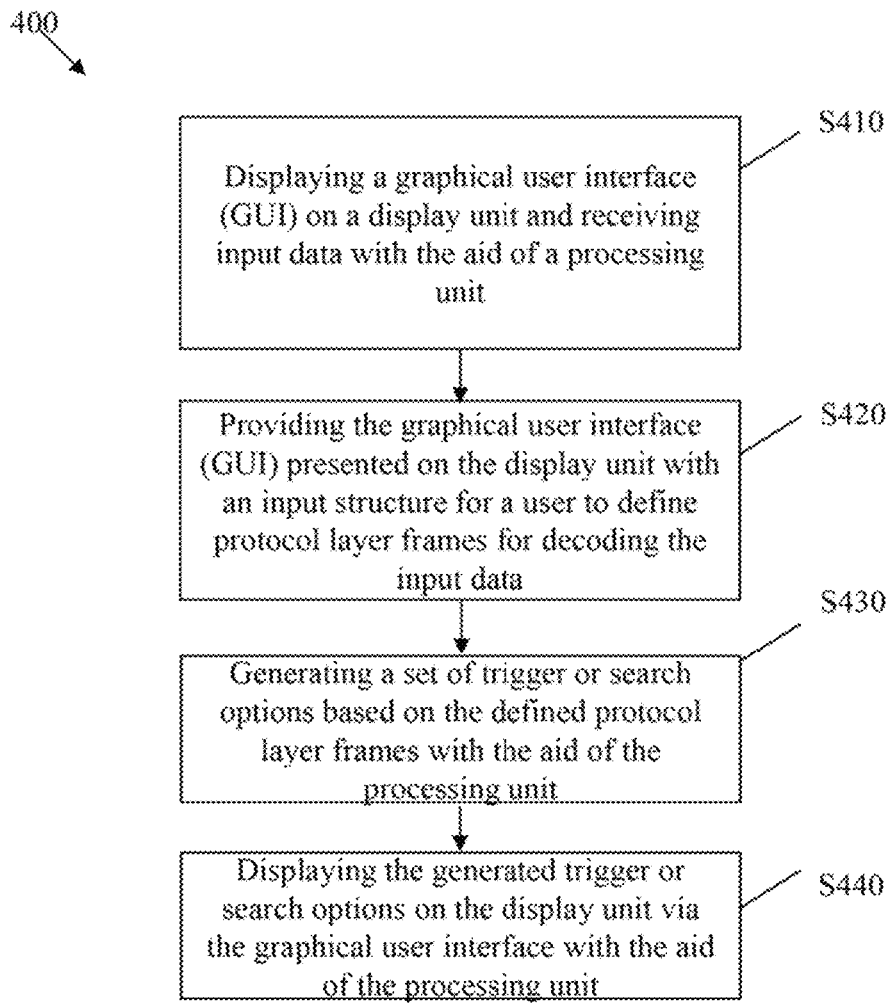
FIG. 4 shows a flow chart of an example test method according to example embodiments of the present invention.

FIG. 4 shows a flow chart of an example test method 400 according to example embodiments of the present invention. In step S410, a GUI is displayed on a display unit with the aid of a processing unit. Further, the processing unit is configured to receive input data from a data transmission network. The input data does not have to follow a predefined protocol that is known by the processing unit. In step S420, the GUI presented on the display is configured to provide an input structure for a user to define protocol layer frames. This allows the user to define any desired protocol structure and ensures that input data having a specific format not known to a test system can be decoded by the test system. In step S430, a set of trigger or search options is generated with the aid of the processing unit, wherein the generation of the options depends on the defined protocol layer frames. Since the trigger or search options are generated based on defined protocol layer frames, the structure defined in step S430 uses the definitions from step S420. In step S440, the generated trigger or search options are displayed on the display unit via the GUI.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test system, for triggering or searching in input data decoded with a user defined protocol, comprising:
    a processor; and
    a display; and
    wherein the processor is configured to control the display to display a graphical user interface (GUI), and to receive the input data, wherein the input data is serial data from a serial bus that is custom to a user,
    wherein the GUI is configured to provide an input structure for the user to define protocol layer frames for decoding the serial data,
    wherein, based on the defined protocol layer frames, the processor is configured to generate a set of trigger or search options, and to control the display to display the set of trigger or search options,
    wherein the processor is configured to decode the serial data in frames arranged in cells based on the defined protocol layer frames,
    wherein a length of the cell is defined by bit count information, and based on previous cells, cell position and next cell start position within the respective frame, and
    wherein the user defined protocol is used for a bidirectional transfer of control and status information between a physical layer entity and a station management entity.

2. The test system according to claim 1, wherein, based on the defined protocol layer frames, the processor is configured to decode the input data in the frames arranged in the cells.

3. The test system according to claim 1, wherein the input structure for the definition of protocol layer frames is a table.

4. The test system according to claim 1, wherein the GUI is configured to facilitate selection of one or more of the displayed trigger or search options and to facilitate input of trigger or search conditions for the selected trigger or search options.

5. The test system according to claim 1, wherein the GUI is configured to facilitate selection of one or more frames and/or cells for the trigger or search options.

6. The test system according to claim 5, wherein the processor is configured to perform a trigger or search function within one or more selected frames and/or cells and to control the display to display results of the trigger or search function via the GUI.

7. The test system according to claim 6, wherein the GUI is configured to facilitate definition of display options for displaying the trigger or search function results.

8. The test system according to claim 4, wherein the trigger or search conditions for the selected trigger or search options define one or more frames or frame types.

9. The test system according to claim 8, wherein the trigger or search conditions for the selected trigger or search options define one or more cells of interest within the one or more frames or frame types.

10. The test system according to claim 9, wherein the trigger or search conditions for the selected trigger or search options define particular values to be triggered on or searched for within the one or more cells.

11. A method, for triggering or searching in input data decoded with a user defined protocol, comprising:
    receiving, by a processor, the input data, wherein the input data is serial data from a serial bus that is custom to a user;
    displaying a graphical user interface (GUI) on a display, wherein the GUI is configured to provide an input structure for the user to define protocol layer frames for decoding the serial data;
    generating, by the processor, a set of trigger or search options based on the defined protocol layer frames;
    displaying the set of trigger or search options on the display; and
    decoding, by the processor, the serial data in frames arranged in cells based on the defined protocol layer frames; and
    wherein a length of the cell is defined by bit count information, and based on previous cells, cell position and next cell start position within the respective frame, and wherein the user defined protocol is used for a bidirectional transfer of control and status information between a physical layer entity and a station management entity.

12. The method according to claim 11, further comprising:

decoding, by the processor, the input data in the frames arranged in the cells based on the defined protocol layer frames.

13. The method according to claim 11, further comprising:

generating an input structure for the definition of the protocol layer frames in a table format.

14. The method according to claim 11, wherein the GUI is configured to facilitate selection of one or more of the displayed trigger or search options and to facilitate input of trigger or search conditions for the selected trigger or search options.

15. The method according to claim 11, wherein the GUI is configured to facilitate selection of one or more frames and/or cells for the trigger or search options.

16. The method according to claim 15, further comprising:

performing, by the processor, a trigger or search function within the one or more selected frames and/or cells; and displaying, on the display, results of the trigger or search function via the GUI.

17. The method according to claim 16, wherein the GUI is configured to facilitate definition of display options for displaying the trigger or search function results.

18. The method according to claim 11, wherein the trigger or search conditions for the selected trigger or search options define one or more frames or frame types.

* * * * *